United States Patent [19]
Pfundstein

[11] 3,807,690
[45] Apr. 30, 1974

[54] VALVE CONSTRUCTION
[75] Inventor: Karl Pfundstein, Frankenthal, Germany
[73] Assignee: Bopp & Reuther GmbH, Mannheim, Germany
[22] Filed: July 17, 1973
[21] Appl. No.: 379,952

[30] Foreign Application Priority Data
July 22, 1972 Germany............................ 2236070

[52] U.S. Cl............................... 251/304, 251/306
[51] Int. Cl............................................. F16k 5/14
[58] Field of Search ........... 251/298, 299, 304, 305, 251/306, 307, 314, 315, 160, 162, 173, 192, 203

[56] References Cited
UNITED STATES PATENTS
3,549,123  12/1970  Bell...................................... 251/306
3,475,007  10/1969  Fawkes................................ 251/305
3,363,645  1/1968  Miller............................ 251/306 X
3,343,805  9/1967  Felton................................ 251/306

Primary Examiner—William R. Cline
Assistant Examiner—Ira S. Lazarus
Attorney, Agent, or Firm—Michael S. Striker

[57] ABSTRACT

A valve housing has an interior passage provided with a longitudinal axis and bounded by a circumferentially complete valve seat. A valve plate is mounted in the passage for movement between passage opening and passage closing positions about a centrol pivot axis which extends transverse to the longitudinal axis and is located in the plane paralleling the plane of the valve plate. A circumferentially complete sealing member is carried by the valve plate for sealing engagement with the valve seat. The seating member and the valve seat each have at opposite sides of the longitudinal axis of the passage two center portions which are mutually inclined in one circumferential direction, and which are connected by a shorter arcuate portion in the one circumferential direction and a longer arcuate portion in the other circumferential direction.

5 Claims, 5 Drawing Figures

VALVE CONSTRUCTION

BACKGROUND OF THE INVENTION

The present invention relates generally to a valve construction, and more particularly to a blocking valve or one-way valve having a pivotable valve plate.

Valves are known having pivotable valve plates which are provided with sealing surfaces cooperating with a centrically located circular valve seat of conical taper, which is engaged tangentially by the sealing surfaces of the valve plate which latter is mounted about a pivot axis that is located outside the general plane of the valve plate itself. Because the sealing or contact line of the valve plate moves during pivoting of the latter to its closure position in an arcuate path located within the outline of the conical taper of the valve seat, a wedging pressure cannot be obtained in the closed position. For this reason it is known in the art to use an enlarged elastic sealing ring which becomes deformed when the valve plate is in closed position and is to provide the necessary sealing action. However, this ring must be pre-stressed over the entire circumference of the valve plate exactly in keeping with the sealing line, and if wear occurs it is necessary that the devices used for prestressing the ring be readjusted.

It is also known to incline the axis of the conically tapered valve seat with respect to the longitudinal axis of the valve housing in such a manner as to provide a wedging action between the valve plate and the valve seat when the former is in closed position. It has been found, however, that in this case a fully effective wedging action can be obtained only in the upper and lower arcuate portion of the sealing line, whereas the wedging action — and thus the force with which the sealing element is pressed against the valve seat — decreases more and more in the direction towards the center of the sealing line which coincides with the pivot axis about which the valve plate pivots, and is zero where the sealing line intersects the pivot axis. The reason for this is that in this region there are no components of movement in direction normal to the sealing plane, so that only a single vector of movement in the sealing plane itself exists, so that the valve sealing member is not properly pressed against the valve seat in this region, meaning that the valve plate will not tightly seal in this area.

SUMMARY OF THE INVENTION

It is, accordingly, a general object of the present invention to overcome the aforementioned disadvantages of the prior art.

More particularly it is an object of the present invention, in a valve construction of the type under discussion, to overcome the aforementioned disadvantages.

Another object of the invention is to provide such a novel valve construction which is not only simple but assures excellent sealing effectiveness over the entire circumference of the valve plate.

In deeping with these objects, and with others which will become apparent hereafter, one feature of the invention resides, in a valve, in a combination which comprises a housing provided with an interior passage having a longitudinal axis and bounded by a circumferentially complete valve seat. A valve plate is mounted in this passage for movement between the passage-opening and passage-closing positions about a central pivot axis which extends transverse to the longitudinal axis and is located in a plane paralleling the plane of the valve plate. A circumferentially complete sealing member is carried by the valve plate for sealing engagement with the valve seat. The sealing member and the valve seat each have at opposite sides of the longitudinal axis two center portions which are mutually inclined in one circumferential direction, and which are connected by a shorter arcuate portion in the one circumferential direction and by a longer arcuate portion in the other circumferential direction.

With this construction the two inclined portions of the sealing member engage the correspondingly inclined portions of the valve seat as the valve plate moves towards closed position, and a further movement of the valve plate until it reaches closed position results in a wedging engagement of the respective cooperating inclined portions, so that the critical center region of the valve plate also provides for a reliable sealing of the passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
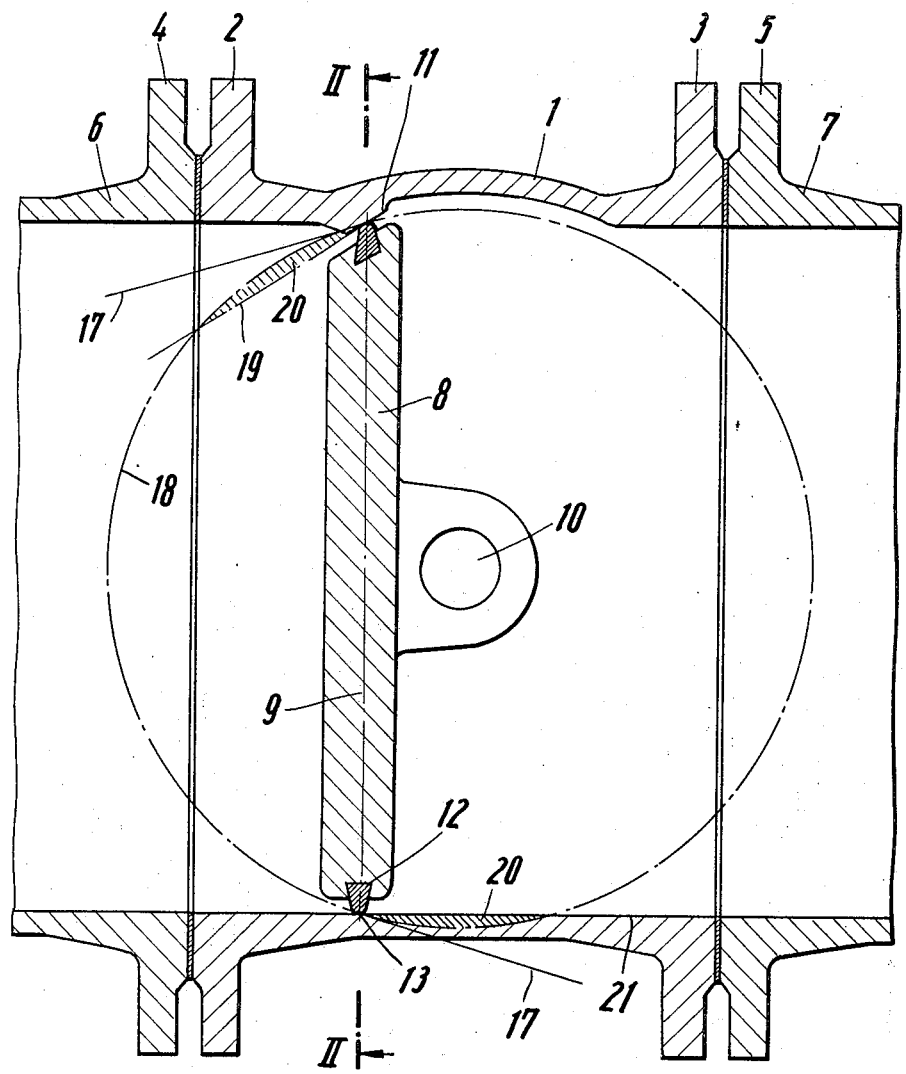
FIG. 1 is a somewhat diagrammatic axial section through a valve according to one embodiment of the invention.
Figure 2:
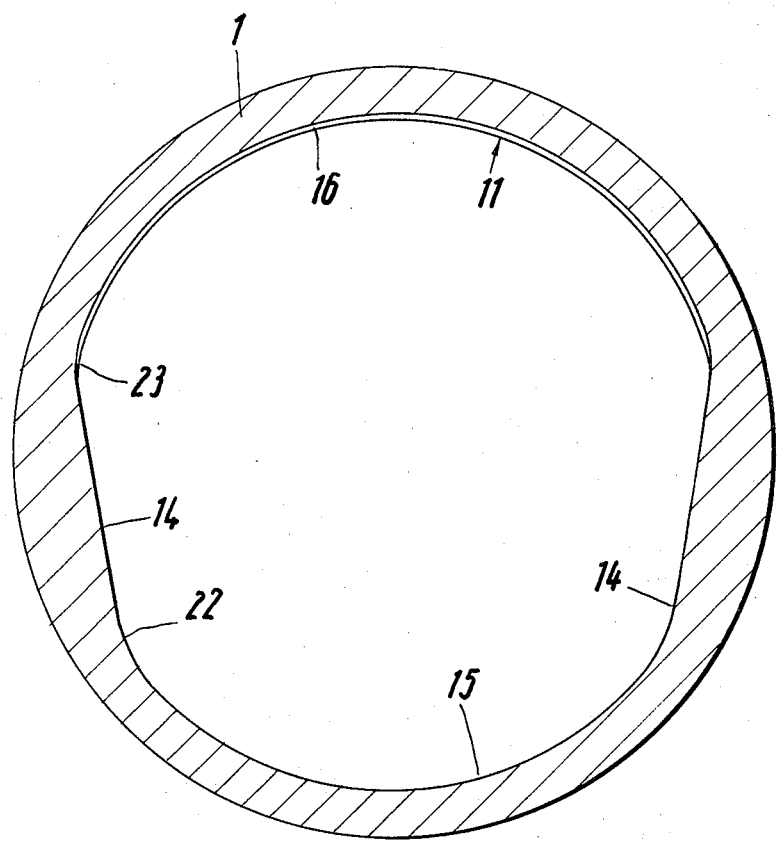
FIG. 2 is a section taken along line II—II of FIG. 1.

Discussing the drawing in detail, and referring firstly to the embodiment illustrated in FIGS. 1 and 2, it will be seen that reference numeral 1 identifies a valve housing having two connecting flanges 2 and 3 to which corresponding flanges 4 and 5 of two conduits 6 and 7 can respectively be connected.

A pivotable valve plate 8 is accommodated in the passage which is defined in the interior of the housing; it is mounted for pivoting movement to and from a closed position about a pivot axis defined by a shaft 10 which is pivotably mounted in the housing 1. The pivot axis extends transversely of the longitudinal axis of the passage defined by the housing 1 and is located outside of the sealing plane 9, that is outside of the central plane of the plate 8. The housing 1 has a circumferentially complete seat 11 which is engaged by a circumferentially complete sealing element 12 of elastomeric material which is mounted on the plate 8, either being vulcanized thereto or being secured to the same in other ways known to those skilled in the art and which, when the plate 8 is in closure position, engages the seat 11.

In accordance with the present invention the seat 11 and the sealing edge 13 of the sealing member 12 are each provided in their respective center region, that is in the region of the pivot axis defined by the shaft 10, with two inclined portions 14 which converge in wedge-shaped or conical manner in the direction of closure movement of the valve plate 8. In one circumferential direction, that is in the direction of the wedging action which occurs during the closure movement, the two portions 14 are connected by a shorter arcuate portion 15 and then the opposite direction they are connected by a longer arcuate portion 16, thus forming a circumferentially complete seat 11 and sealing member 12 (or sealing edge 13 thereof), respectively. The provision of the inclined portions 14 assures that the inclined portions of the sealing member 12 will wedgingly engage the inclined portions of the seat 11 as the plate 8 moves towards closed position, and this engagement will be taking place in the center region of the sealing plane 9, and during further movement of the plate 8 to closed position the inclined portions of the sealing member 12 are wedged into the inclined portions of the seat 11, thus providing a reliable sealing effect in this region.

It is desirable that a similar wedging effect be obtained in the region of the curved or arcuate portions 15 and 16 also. To provide this, the seat 11 is formed in the regions 15 and 16 thereof of conical configuration. The portions 15 and 16 of the seat 11 are wedge-shaped with respect to the tangent 17 of the arcuate pivot path 18 of all sealing points and enter into these paths 18 in the direction in which the valve plate 8 moves to close the passage of the housing. This means that in the region of the portions 15 and 16 the shaded circular segments 20 are obtained, which are delimited by the extension of the surfaces of the seat 11, which assure a wedging effect in the region of the portions 15 and 16 also. In other words, the sealing effect will be obtained by wedging the member 12 into the seat 11 over the entire circumference of the plate 8, on the one hand in the direction of the inclined portions 14 and on the other hand in an other plane via the conical surfaces of the portions 15 and 16. A subsequent adjustment of the sealing member 12, for instance due to wear as in the prior art, is now no longer necessary because a reliable seal will be obtained without it at all times.

To assure that at the bottom wall 21 of the housing 1 the inner surface bounding the passage is flush with the conduits 6 and 7, that is with the openings connecting the passage with these conduits, the seating surface of the seat 11 is located in the region of the portion 15 in the plane of the surface bounding the passage. A gradual transition between the portions 14 on the one hand and the portions 15 and 16 on the other hand, is obtained by providing transition portions 22 and 23.

Figure 3:
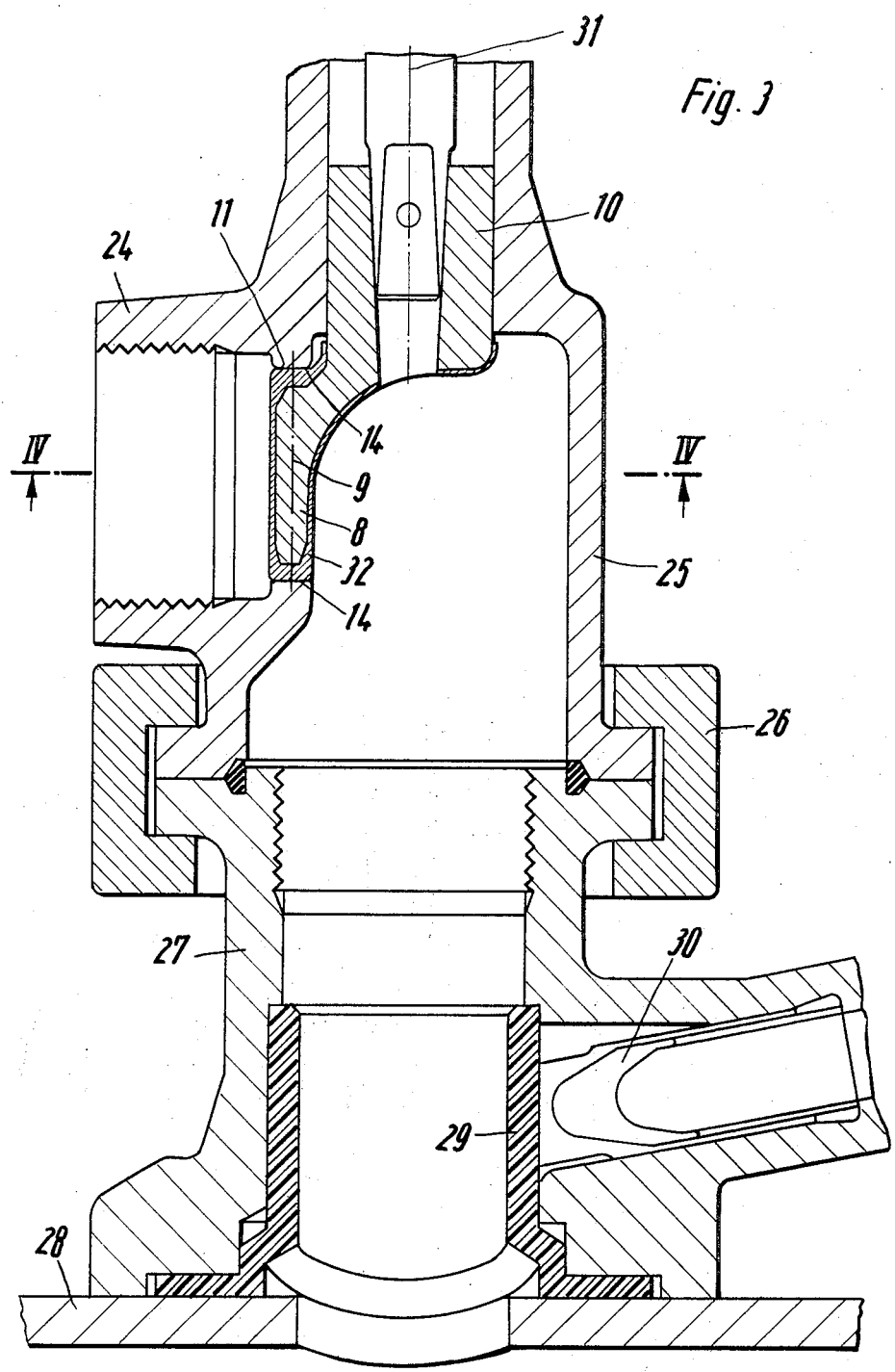
FIG. 3 is a further sectional view illustrating an additional embodiment of the invention.
Figure 4:
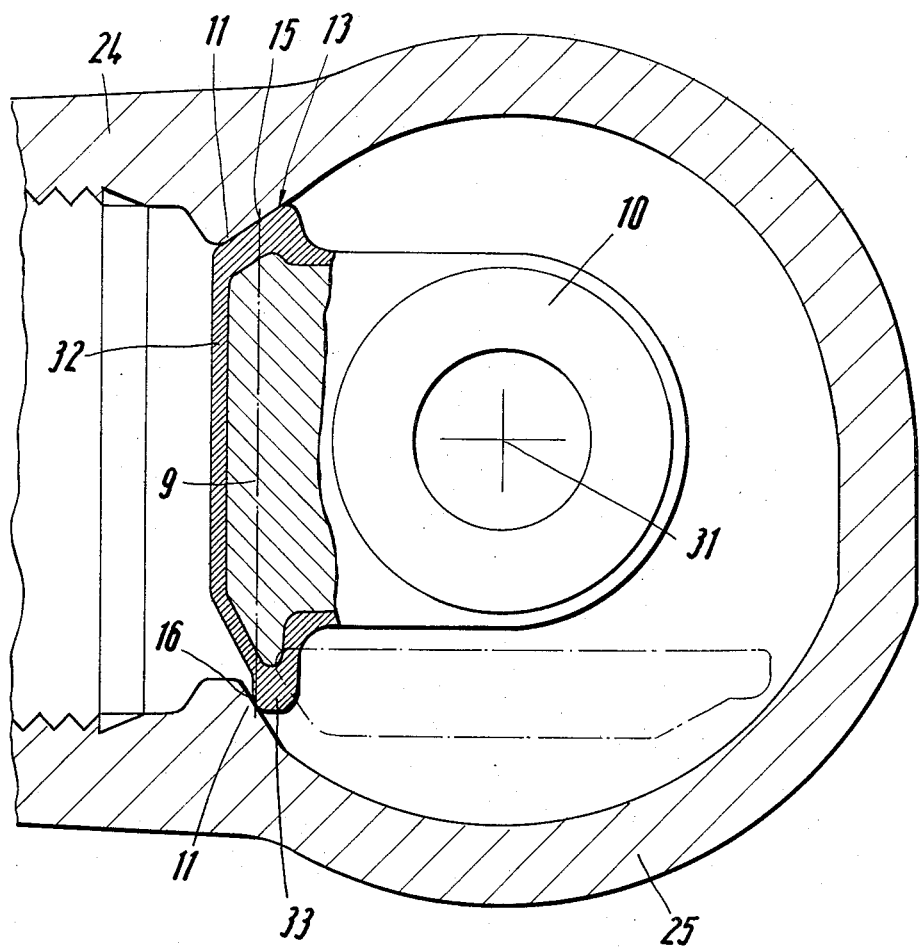
FIG. 4 is a section taken on line IV—IV of FIG. 3.
Figure 5:
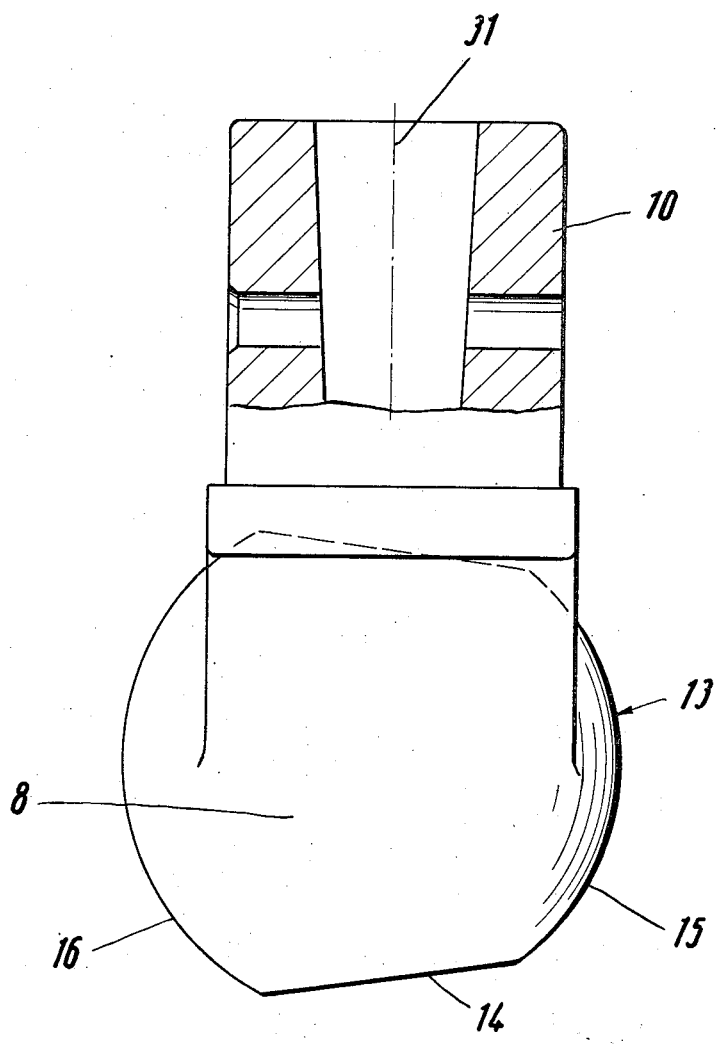
FIG. 5 is a rear view of the valve plate in the embodiment of FIGS. 3 and 4.

In the embodiment of FIGS. 3–5 I have illustrated a valve construction for small nominal valve openings. In the illustrated embodiment the valve plate 8 serves to close off a house connecting conduit 24 of a rectangular housing 25 which is connected via a coupling 26 with a member 27 of an element (shown only diagrammatically) mounted on the conduit or pipe 28. This element uses a hose valve 29 with a pressure member 30. The valve plate 8 is again mounted for pivoting movement about the shaft 10 whose pivot axis 31 is far off center with respect to the sealing plane 9, so that in the open position the valve plate 8 is located outside the flow-through cross section of the housing 25. In this embodiment the valve plate 8 is completely covered with an elastic coating 32 of rubber, synthetic plastic material or the like, which may be vulcanized or otherwise secured to it, and which defines the elastic sealing edge 13 in the marginal zone of the valve plate 8. The latter is of metallic material and providing it with this coating assures an absolutely tight good seating of the sealing edge 13 (i.e., of the coating per se) on the valve plate without any possibility of relative displacement.

While the sealing edge 13 of the valve plate 8 in the embodiment of FIGS. 1 and 2 is very narrow and theoretically provides only for a line contact, the sealing edge in the embodiment of FIGS. 3–5 provides for an area contact. This means that when the valve plate 8 in the embodiment of FIGS. 3–5 is in closure position, the inclined portions 14 of the valve plate 8 will engage over large surface areas with the corresponding inclined portions of the seat 11. In addition, the shorter arcuate portion 15 of the valve plate 8 engages the correspondingly configurated portion of the seat 11 in the surface or area contact, and the same is true of the portions 16. The portions 16 of the plate 8 in this embodiment is provided with a lip-like projection 33 which, in the closed position of the valve plate, is tightly pressed against the corresponding surface of the seat 11 under the pressure of the medium in the passage so that even in case of small passage dimensions a completely tight engagement of the edge 13 with the seat 11 is assured.

FIG. 5 shows particularly clearly the configuration of the portions 14 on the valve plate 8 in the region of the shaft 10, as well as the configuration and contours of the portions 15 and 16. In this embodiment the valve plate 8 is pivoted from above —by turning of the shaft 10— from its lateral open position (shown in broken lines in FIG. 4) to its valve closing position.

It should be pointed out still that the arrangement in which the portion 15 of the seat 11 is flush with the inner circumferential surface bounding the passage of the housing at the bottom thereof, as shown in FIGS. 1 and 2, is particularly advantageous for constructions in which the housing as well as the associated conduits are arranged horizontally or substantially horizontally, and this of course provides for an unhindered passage of the medium through the housing 1, with a minimum of disturbance of its flow and with a minimum of depositions of matter in the housing 1.

It will be understood that each of the elements described above, or two or more together, may also find a useful application in other types of constructions differing from the types described above.

While the invention has been illustrated and described as embodied in a valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims

1. In a valve, a combination comprising a housing provided with an interior passage having a longitudinal axis and bounded by a circumferentially complete valve seat; a valve plate mounted in said passage for movement between passage-opening and passage-closing positions about a central pivot axis which extends transverse to said longitudinal axis and is located in a plane paralleling the plane of said valve plate; and a circumferentially complete sealing member carried by said valve plate for sealing engagement with said valve seat, said sealing member and said valve seat each having at opposite sides of said longitudinal axis two center portions which are mutually inclined in one circumferential direction, and which are connected by a shorter arcuate portion in said one circumferential direction and by a larger arcuate portion in the other circumferential direction.

2. A combination as defined in claim 1, wherein at least one of said valve seat and sealing member is of wedge-shaped cross-section in the region of said arcuate portions.

3. A combination as defined in claim 1, wherein said valve plate is of metallic material; and wherein said sealing member is a coating of elastically yieldable sealing material surrounding and vulcanized on said valve seat, said coating having a circumferentially complete margin which cooperates with said valve seat and which has said portions.

4. A combination as defined in claim 3, wherein said sealing material is rubber.

5. A combination as defined in claim 1, wherein said longitudinal axis of substantially horizontal, and said shorter arcuate portions one located downwardly thereof, said passage having an opening adapted to be connected with a conduit and also having a bottom wall portion below said longitudinal axis; and wherein said shorter arcuate portion of at least said valve seat is so arranged that in the region of said bottom wall portion its curvature coincices with that of said opening.

* * * * *